(12) United States Patent
Kagawa et al.

(10) Patent No.: US 10,479,396 B2
(45) Date of Patent: Nov. 19, 2019

(54) STEERING SYSTEM

(71) Applicant: JTEKT CORPORATION, Osaka-shi, Osaka (JP)

(72) Inventors: Rika Kagawa, Nara (JP); Kiyoto Takei, Kashihara (JP); Akihiro Takami, Yao (JP); Tomoki Arai, Kitakatsuragi-gun (JP); Hideyoshi Hanai, Sagamihara (JP); Tsuyoshi Kojima, Ome (JP); Hiroshi Obata, Okazaki (JP)

(73) Assignee: JTEKT CORPORATION, Osaka-shi (JP)

(*) Notice: Subject to any disclaimer, the term of this patent is extended or adjusted under 35 U.S.C. 154(b) by 189 days.

(21) Appl. No.: 15/848,931

(22) Filed: Dec. 20, 2017

(65) Prior Publication Data
US 2018/0178826 A1 Jun. 28, 2018

(30) Foreign Application Priority Data
Dec. 27, 2016 (JP) .................................. 2016-253547

(51) Int. Cl.
*B62D 1/19* (2006.01)
*B62D 1/184* (2006.01)

(52) U.S. Cl.
CPC ............. *B62D 1/195* (2013.01); *B62D 1/184* (2013.01)

(58) Field of Classification Search
CPC .......... B62D 1/195; B62D 1/184; B62D 1/19; B62D 1/185; B62D 1/187; B62D 1/189; B62D 1/192
USPC .................................. 74/493; 280/775, 777
See application file for complete search history.

(56) References Cited

U.S. PATENT DOCUMENTS

| | | | | | |
|---|---|---|---|---|---|
| 5,562,307 | A | * | 10/1996 | Connor | B62D 1/195 188/371 |
| 5,820,163 | A | * | 10/1998 | Thacker | B62D 1/184 280/775 |
| 8,783,717 | B2 | * | 7/2014 | Tinnin | B62D 1/195 280/777 |

(Continued)

FOREIGN PATENT DOCUMENTS

| | | |
|---|---|---|
| EP | 2923922 A2 | 9/2015 |
| EP | 3078567 A1 | 10/2016 |
| JP | 2015-182614 A | 10/2015 |

OTHER PUBLICATIONS

May 8, 2018 Extended European Search Report issued in Patent Application No. 17210012.5.

*Primary Examiner* — Keith J Frisby
(74) *Attorney, Agent, or Firm* — Oliff PLC

(57) ABSTRACT

A second toothed member is configured to change its position between a meshing position where first teeth mesh with second teeth and a meshing releasing position where the first teeth do not mesh with the second teeth. A first toothed member and a facing member move together with an upper jacket. The second toothed member located at the meshing position receives an impact from the first toothed member so as to collide against an impact absorbing member after rupture of a guide shaft and deform the impact absorbing member. The second toothed member located at the meshing releasing position receives an impact from the facing member so as to cause rupture of the guide shaft and deformation of the impact absorbing member to occur concurrently.

6 Claims, 9 Drawing Sheets

(56) References Cited

U.S. PATENT DOCUMENTS

| | | | |
|---|---|---|---|
| 9,994,247 B2* | 6/2018 | Dubay | B62D 1/195 |
| 2010/0300238 A1* | 12/2010 | Ridgway | B62D 1/184 74/493 |
| 2015/0266499 A1 | 9/2015 | Yoshihara et al. | |

\* cited by examiner

STEERING SYSTEM

INCORPORATION BY REFERENCE

The disclosure of Japanese Patent Application No. 2016-253547 filed on Dec. 27, 2016, including the specification, drawings and abstract, is incorporated herein by reference in its entirety.

BACKGROUND OF THE INVENTION

1. Field of the Invention

The invention relates to steering systems.

2. Description of the Related Art

A steering system disclosed in Japanese Patent Application Publication No. 2015-182614 (JP 2015-182614 A) includes a lock member with a tooth. A support shaft supported by a lower jacket is inserted through the lock member. The tooth of the lock member comes into engagement with a hole in a lock plate secured to an upper jacket. This engagement locks the position of the upper jacket. With the tooth of the lock member out of engagement with the hole in the lock plate, the upper jacket is moved relative to the lower jacket. The movement of the upper jacket enables a telescopic adjustment to adjust the position of a steering member.

With the tooth of the lock member in engagement with the hole in the lock plate, occurrence of a vehicle collision applies a load to the lock member through the lock plate. An impact caused by the collision is transmitted to the support shaft through the lock member so as to rupture the support shaft. The rupture of the support shaft allows the upper jacket to move relative to the lower jacket (or allows disengagement of the upper jacket from the lower jacket) at the time of the vehicle collision. This absorbs the impact at the time of the vehicle collision.

The steering system disclosed in JP 2015-182614 A includes a stopper to limit the position of the upper jacket. The stopper is provided on the lock plate. Contact of the lock member with the stopper limits the moving range of the upper jacket during telescopic adjustment. When the lock member is in contact with the stopper, an impact is transmitted to the support shaft through the lock member. Under normal circumstances, an impact transmitted to the support shaft when the lock member is in contact with the stopper does not rupture the support shaft.

Designing a steering system involves first setting a load necessary for disengagement of an upper jacket from a lower jacket at the time of a vehicle collision (which will be referred to as a "disengagement load"), and then setting the strength of a support shaft in accordance with the disengagement load set. Thus, when a value set for the disengagement load is lower than normal, the strength of the support shaft is set to be lower than normal in accordance with the disengagement load. In this case, an impact transmitted to the support shaft when a lock member comes into contact with a stopper may cause accidental rupture of the support shaft. Accordingly, a steering system is preferably configured such that if a lock member receives, during telescopic adjustment, an impact substantially equal to that applied to the lock member at the time of a vehicle collision, the impact transmitted to the support shaft during telescopic adjustment would be less than the impact transmitted to the support shaft at the time of the vehicle collision.

SUMMARY OF THE INVENTION

An object of the invention is to provide a steering system including a rupturable member that ruptures upon receiving an impact and capable of preventing rupture of the rupturable member caused by an impact applied during telescopic adjustment.

A steering system according to an aspect of the invention includes an upper jacket, a lower jacket, a first toothed member, a second toothed member, a facing member, a rupturable member, and an impact absorbing member. The upper jacket is movable in an axial direction. The upper jacket includes a first axial end and a second axial end. The first axial end is connected with a steering member. The lower jacket is fitted to the second axial end of the upper jacket. The first toothed member is secured to the upper jacket. The first toothed member is configured to move together with the upper jacket. The first toothed member includes first teeth arranged in the axial direction. The second toothed member includes second teeth configured to mesh with the first teeth. The second toothed member is configured to change its position between a meshing position where the first teeth mesh with the second teeth and a meshing releasing position where the first teeth do not mesh with the second teeth. The facing member is configured to move together with the upper jacket. The facing member faces, from the first axial end, the second toothed member located at the meshing releasing position. The rupturable member is supported by the lower jacket. The rupturable member is disposed through the second toothed member. The rupturable member is rupturable by an impact received by the second toothed member from the first toothed member or the facing member and transmitted to the rupturable member. The impact absorbing member is configured to deform so as to absorb an impact received by the second toothed member. The second toothed member located at the meshing position receives an impact from the first toothed member so as to collide against the impact absorbing member after rupture of the rupturable member and deform the impact absorbing member. The second toothed member located at the meshing releasing position receives an impact from the facing member so as to cause rupture of the rupturable member and deformation of the impact absorbing member to occur concurrently.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
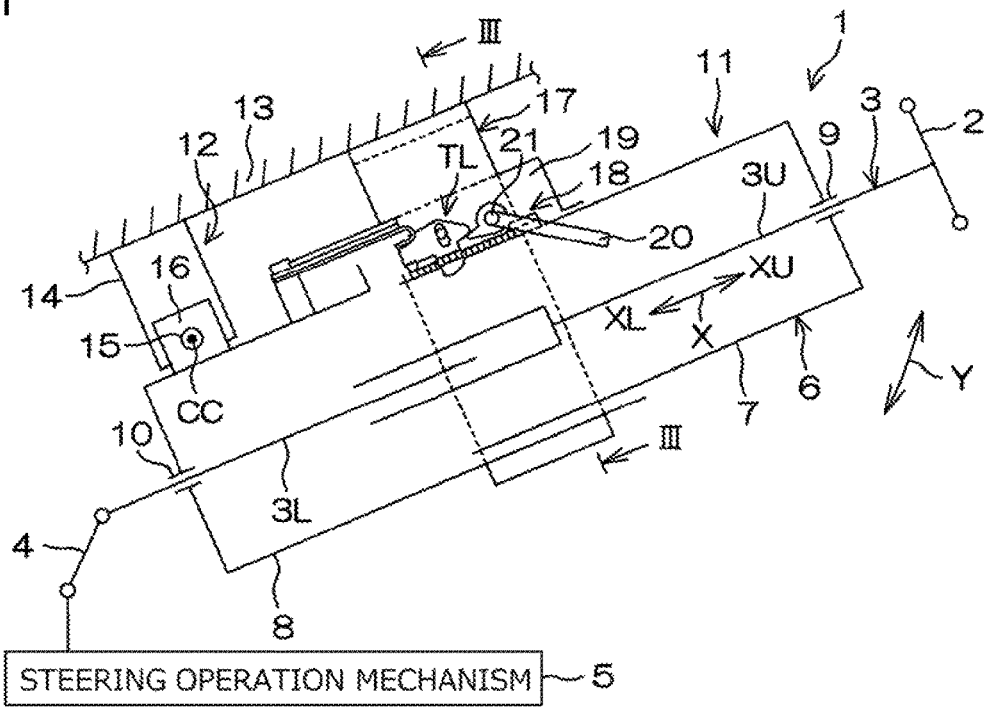
FIG. 1 is a schematic side view of a steering system according to a first embodiment of the invention.

Embodiments of the invention will be described in detail below with reference to the accompanying drawings. FIG. 1 is a schematic side view of a steering system 1 according to a first embodiment of the invention. Referring to FIG. 1, the steering system 1 includes a steering shaft 3, a column jacket 6, an intermediate shaft 4, and a steering operation mechanism 5. A steering member 2, such as a steering wheel, is coupled to an end of the steering shaft 3 (e.g., an axial upper end of the steering shaft 3). In response to a steering operation performed on the steering member 2, the steering system 1 steers steered wheels (not illustrated). Examples of the steering operation mechanism 5 include, but not limited to, a rack and pinion mechanism.

The axial direction of the steering shaft 3 will hereinafter be referred to as a "column axial direction X". The column axial direction X includes: an upward axial direction XU that is a direction extending upward in the column axial direction X; and a downward axial direction XL that is a direction extending downward in the column axial direction X. The steering shaft 3 includes a tubular upper shaft 3U and a lower shaft 3L. The upper shaft 3U and the lower shaft 3L are fitted to each other by spline fitting or serration fitting, for example, such that the upper shaft 3U and the lower shaft 3L are movable relative to each other. The steering member 2 is coupled to an end of the upper shaft 3U located in the upward axial direction XU.

The column jacket 6 includes a tubular upper jacket 7 and a lower jacket 8. The steering member 2 is connected to a first end of the upper jacket 7 through the upper shaft 3U. The lower jacket 8 is slidably fitted to a second end of the upper jacket 7. The lower jacket 8 also serves as an outer jacket. The upper jacket 7 also serves as an inner jacket internally fitted to the lower jacket 8. The column axial direction X corresponds to the axial direction of the upper jacket 7 and the axial direction of the lower jacket 8. The upward axial direction XU corresponds to a direction toward the first end of the upper jacket 7. The downward axial direction XL corresponds to a direction toward the second end of the upper jacket 7.

The steering shaft 3 is inserted through the column jacket 6. The upper shaft 3U is rotatably supported by the upper jacket 7 via a bearing 9. The lower shaft 3L is rotatably supported by the lower jacket 8 via a bearing 10. The upper shaft 3U slides in the column axial direction X relative to the lower shaft 3L. This enables the column jacket 6 to expand and contract in the column axial direction X together with the steering shaft 3.

Expansion or contraction of the steering shaft 3 and the column jacket 6 in the column axial direction X makes it possible to adjust the position of the steering member 2 in the column axial direction X (which substantially corresponds to the front-rear direction of a vehicle). As used herein, the term "telescopic adjustment" refers to adjustment of the position of the steering member 2 in the column axial direction X. Thus, the steering system 1 has a telescopic adjustment function. A telescopic adjustment is made by moving the upper jacket 7 within a predetermined telescopic stroke range. As used herein, the term "telescopic stroke range" refers to a range defined between a sliding lower limit position and a sliding upper limit position. As used herein, the term "sliding lower limit position" refers to the farthest position that the second end (i.e., the lower end) of the upper jacket 7 can slide downward in the column axial direction X. As used herein, the term "sliding upper limit position" refers to the farthest position that the first end (i.e., the upper end) of the upper jacket 7 can slide upward in the column axial direction X. The column jacket 6 is in its most contracted state when the upper jacket 7 is located at the sliding lower limit position. The column jacket 6 is in its most expanded state when the upper jacket 7 is located at the sliding upper limit position.

As used herein, the term "telescopically shortest state" refers to the most contracted state of the column jacket 6 within the telescopic stroke range. The sliding lower limit position may also be referred to as a "telescopically shortest position". As used herein, the term "telescopically longest state" refers to the most expanded state of the column jacket 6 within the telescopic stroke range. The sliding upper limit position may also be referred to as a "telescopically longest position". The steering system 1 further includes a secured bracket 14, a tilt center shaft 15, and a column bracket 16. The secured bracket 14 is secured to a vehicle body 13. The tilt center shaft 15 is supported by the secured bracket 14. The column bracket 16 is secured to the outer periphery of the lower jacket 8. The column bracket 16 is rotatably supported by the tilt center shaft 15. The steering shaft 3 and the column jacket 6 are rotatable in a tilt direction Y around a tilt center CC. The tilt center CC is the central axis of the tilt center shaft 15.

Rotating the steering shaft 3 and the column jacket 6 around the tilt center CC makes it possible to adjust the position of the steering member 2 in the tilt direction Y (which substantially corresponds to the height direction of the vehicle). Thus, the steering system 1 has a tilt adjustment function. The steering system 1 further includes a bracket 17 and a clamping mechanism 18. The bracket 17 is secured to the vehicle body 13. The clamping mechanism 18 locks the position of the steering member 2 after tilt adjustment and telescopic adjustment. The clamping mechanism 18 locks the position of the steering member 2 by clamping a pair of clamped portions 19 through the bracket 17. The pair of clamped portions 19 are integral with an upper portion of the lower jacket 8 in the column axial direction X.

Figure 2:
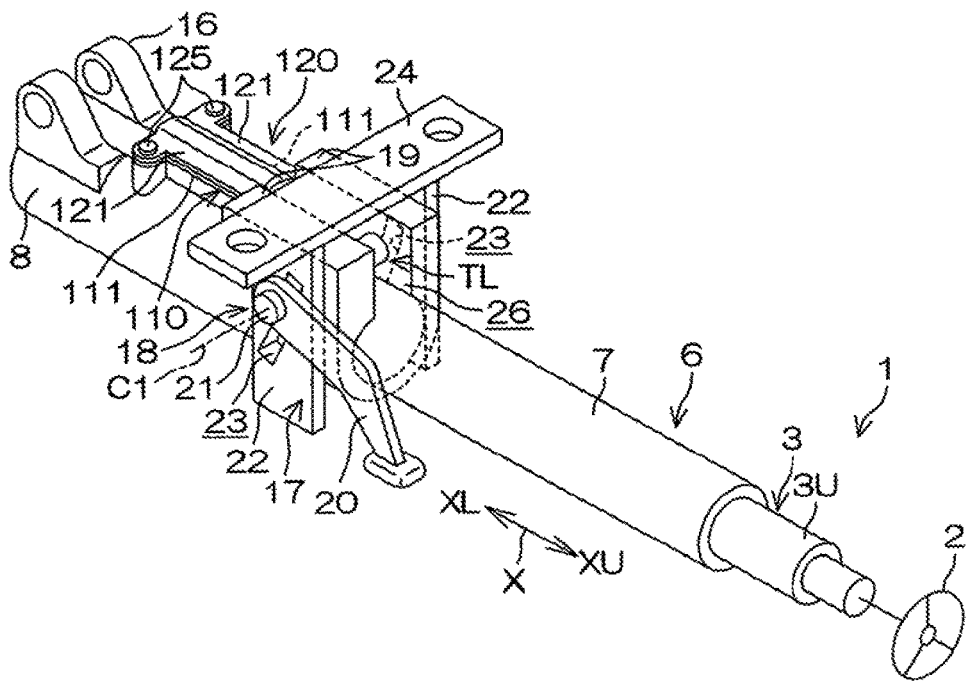
FIG. 2 is a schematic perspective view of the steering system.
Figure 3:
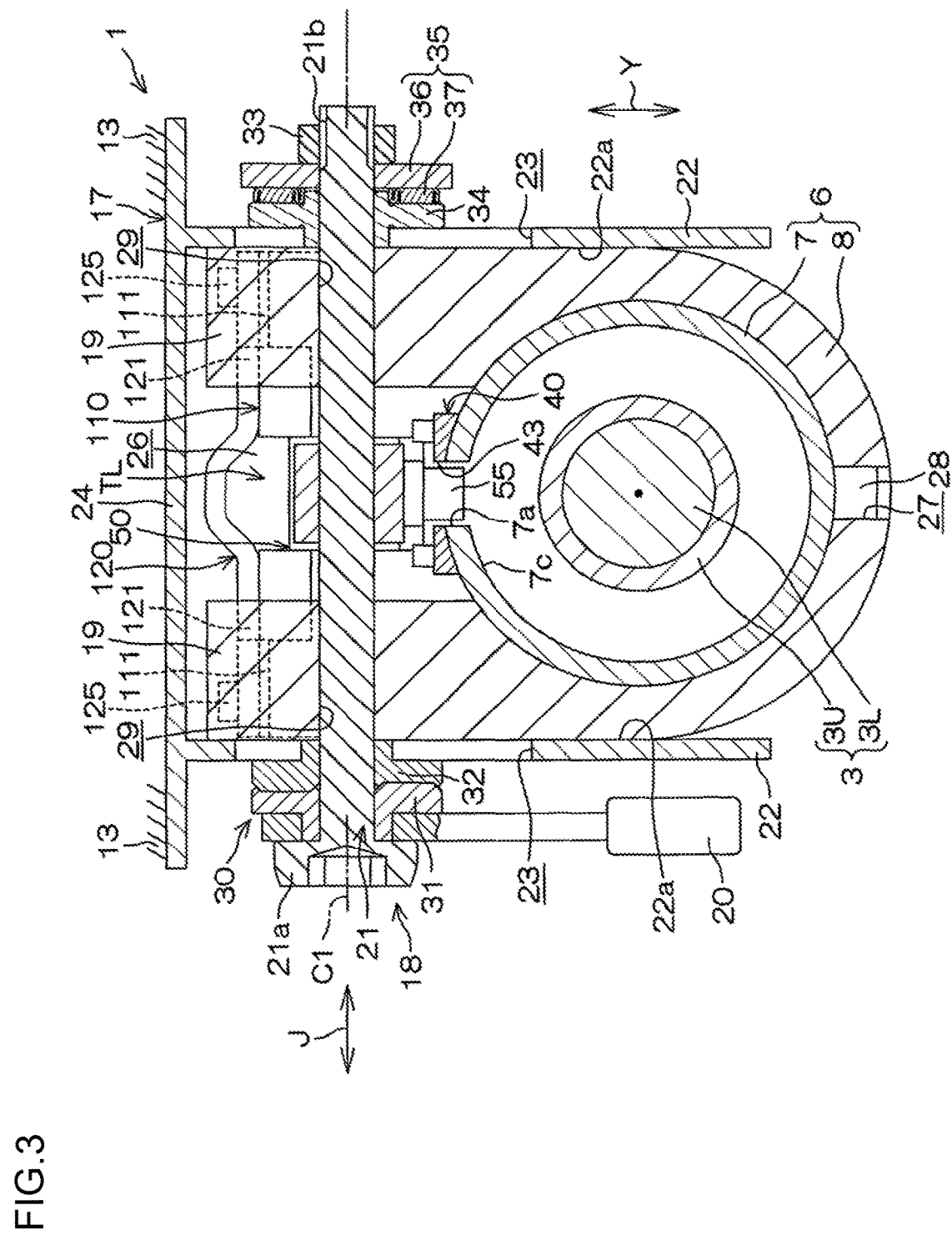
FIG. 3 is a cross-sectional view taken along the line III-III in FIG. 1.

FIG. 2 is a schematic perspective view of the steering system 1. As illustrated in FIG. 2, the lower jacket 8 includes a slit 26 extending in the downward axial direction XL from an upper end of the lower jacket 8 in the column axial direction X. The pair of clamped portions 19 are disposed on both sides of the slit 26. Clamping the pair of clamped portions 19 enables the lower jacket 8 to be elastically reduced in diameter. FIG. 3 is a schematic cross-sectional view of the steering system 1 taken along the line III-III in FIG. 1.

As illustrated in FIG. 3, the bracket 17 includes an attached plate 24 and a pair of side plates 22. The left side plate 22 in FIG. 3 may hereinafter be referred to as a "first side plate 22", and the right side plate 22 in FIG. 3 may hereinafter be referred to as a "second side plate 22". The attached plate 24 is attached to the vehicle body 13. The side plates 22 extend downward in the tilt direction Y from the ends of the attached plate 24. Each of the side plates 22 is provided with a tilt elongated hole 23 extending in the tilt direction Y. The pair of clamped portions 19 of the lower jacket 8 are disposed between the pair of side plates 22. The pair of clamped portions 19 each have a plate shape conforming to an inner surface 22a of the associated side plate 22. Each of the clamped portions 19 is provided with a first insertion hole 29. The first insertion hole 29 is a circular hole.

The lower jacket 8 is provided with a guide groove 27 extending in the column axial direction X. A guided protrusion 28 secured to the upper jacket 7 is fitted to the guide groove 27. The guide groove 27 and the guided protrusion 28 fitted to the guide groove 27 limit rotation of the upper jacket 7 relative to the lower jacket 8. During telescopic adjustment, the guided protrusion 28 abuts against an end of the guide groove 27 in the upward axial direction XU (not illustrated) when the upper jacket 7 reaches the sliding upper limit position. Thus, the upper jacket 7 does not move beyond the sliding upper limit position within the telescopic stroke range. This prevents disconnection of the upper jacket 7 from the lower jacket 8.

As illustrated in FIGS. 1 and 2, the clamping mechanism 18 includes a clamping shaft 21 and an operating lever 20 by which the clamping shaft 21 is rotated. A central axis C1 of the clamping shaft 21 corresponds to the center of rotation of the operating lever 20. The clamping shaft 21 is a bolt. The clamping shaft 21 is inserted through the tilt elongated holes 23 in the side plates 22 of the bracket 17 and the first insertion holes 29 in the clamped portions 19 of the lower jacket 8. The clamping shaft 21 and the lower jacket 8 move relative to the bracket 17 within the tilt elongated holes 23 during tilt adjustment.

A head 21a is provided on a first end of the clamping shaft 21. The head 21a is secured to the operating lever 20 so as to be rotatable together with the operating lever 20. The clamping mechanism 18 further includes a power conversion mechanism 30 interposed between the head 21a of the clamping shaft 21 and the first side plate 22 (i.e., the left side plate 22 in FIG. 3). The power conversion mechanism 30 converts an operating torque applied to the operating lever 20 into an axial force exerted on the clamping shaft 21 (i.e., a clamping force to clamp the pair of side plates 22). The power conversion mechanism 30 includes a rotating cam 31 and a first clamping member 32. The rotating cam 31 is coupled to the operating lever 20 so as to be rotatable together with the operating lever 20. This prevents movement of the rotating cam 31 relative to the clamping shaft 21 in a clamping axial direction J that is a direction in which the central axis C1 extends. The first clamping member 32 is in cam engagement with the rotating cam 31 and clamps the first side plate 22. The first clamping member 32 is a non-rotating cam whose rotation is prevented.

The clamping mechanism 18 further includes a nut 33, a second clamping member 34, and an interposed member 35. The nut 33 is screwed to a screw portion 21b provided on a second end of the clamping shaft 21. The second clamping member 34 clamps the second side plate 22 (i.e., the right side plate 22 in FIG. 3). The interposed member 35 is interposed between the second clamping member 34 and the nut 33. The interposed member 35 includes a washer 36 and a needle roller bearing 37. The rotating cam 31, the first clamping member (non-rotating cam) 32, the second clamping member 34, and the interposed member 35 are supported by the outer periphery of the clamping shaft 21. The first clamping member 32 and the second clamping member 34 are each fitted to an associated one of the tilt elongated holes 23. This prevents rotation of the first clamping member 32 and the second clamping member 34.

In accordance with rotation of the operating lever 20 in a locking direction, the rotating cam 31 rotates relative to the clamping member 32. The rotation of the rotating cam 31 relative to the clamping member 32 causes the clamping member 32 to move away from the rotating cam 31 in the clamping axial direction J. Thus, the clamping members 32 and 34 clamp the pair of side plates 22 of the bracket 17. In this case, each side plate 22 of the bracket 17 clamps an associated one of the clamped portions 19 of the lower jacket 8. This clamping prevents movement of the lower jacket 8 in the tilt direction Y so as to effect "tilt locking". Because the clamped portions 19 are clamped, the lower jacket 8 is elastically reduced in diameter so as to clamp the upper jacket 7. As a result, movement of the upper jacket 7 in the column axial direction X is prevented, thus achieving "telescopic locking".

As used herein, the term "locked state" refers to a state of the steering system 1 where the position of the steering member 2 is locked in the tilt direction Y and the column axial direction X, i.e., a state of the steering system 1 where tilt locking and telescopic locking are effected. Rotation of the operating lever 20 in an unlocking direction causes rotation of the rotating cam 31 such that the clamping member 32 moves to or toward the rotating cam 31 in the clamping axial direction J. Thus, clamping of the pair of side plates 22 by the clamping members 32 and 34 is released so as to enable tilt adjustment and telescopic adjustment.

As used herein, the term "unlocked state" refers to a state of the steering system 1 where the position of the steering member 2 is unlocked in the tilt direction Y and the column axial direction X, i.e., a state of the steering system 1 where tilt locking and telescopic locking are released. The steering system 1 further includes a tooth locking mechanism TL to prevent movement of the upper jacket 7 relative to the lower jacket 8 in a telescopic direction. The tooth locking mechanism TL is configured such that first teeth 41 and second teeth 51 (which will be described below) mesh with each other so as to maintain the telescopic position of the upper jacket 7. As used herein, the term "tooth locking" refers to a state where the telescopic position of the upper jacket 7 is maintained by meshing of the first teeth 41 and the second teeth 51.

Figure 4:
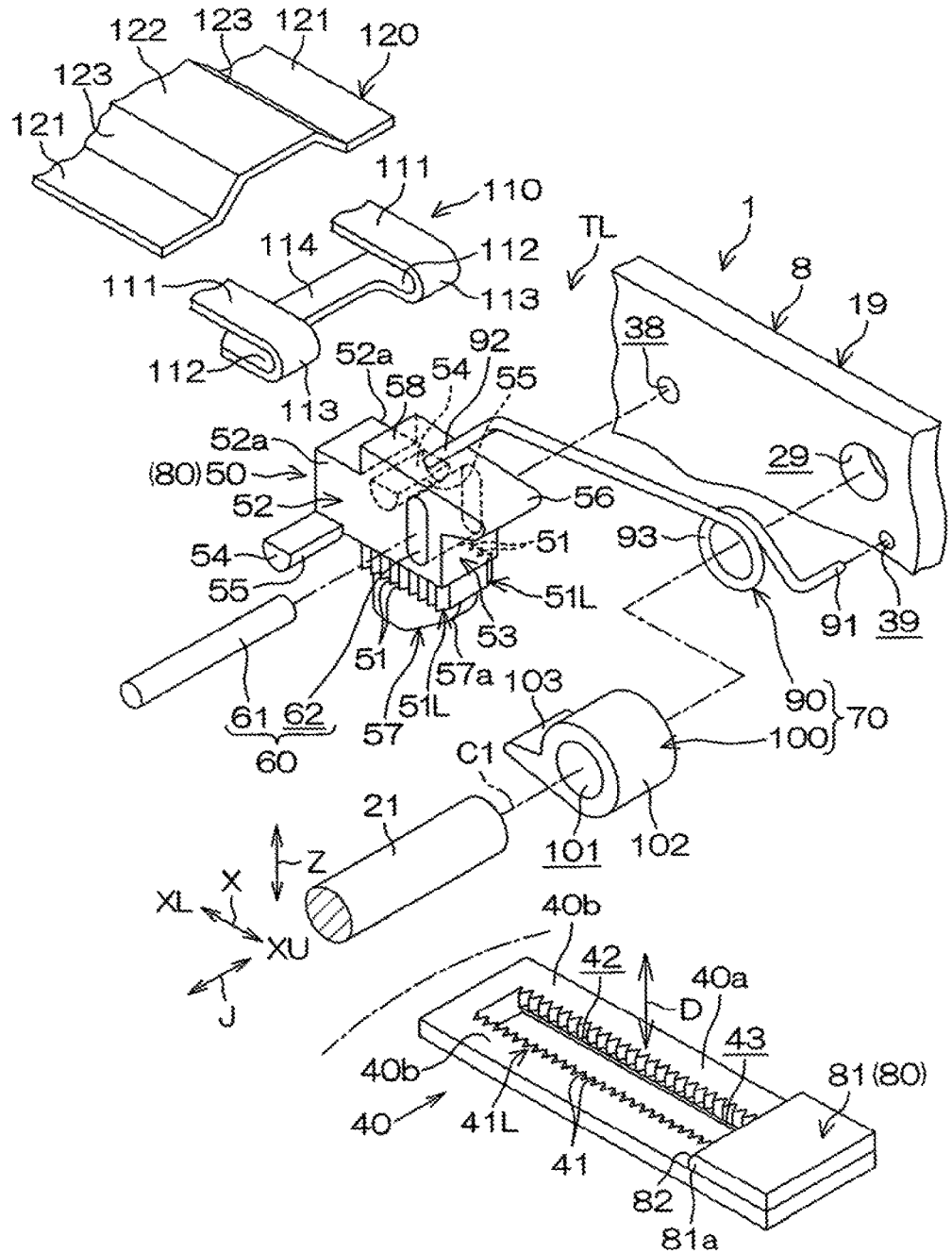
FIG. 4 is an exploded perspective view of a tooth locking mechanism and components adjacent thereto.
Figure 5:
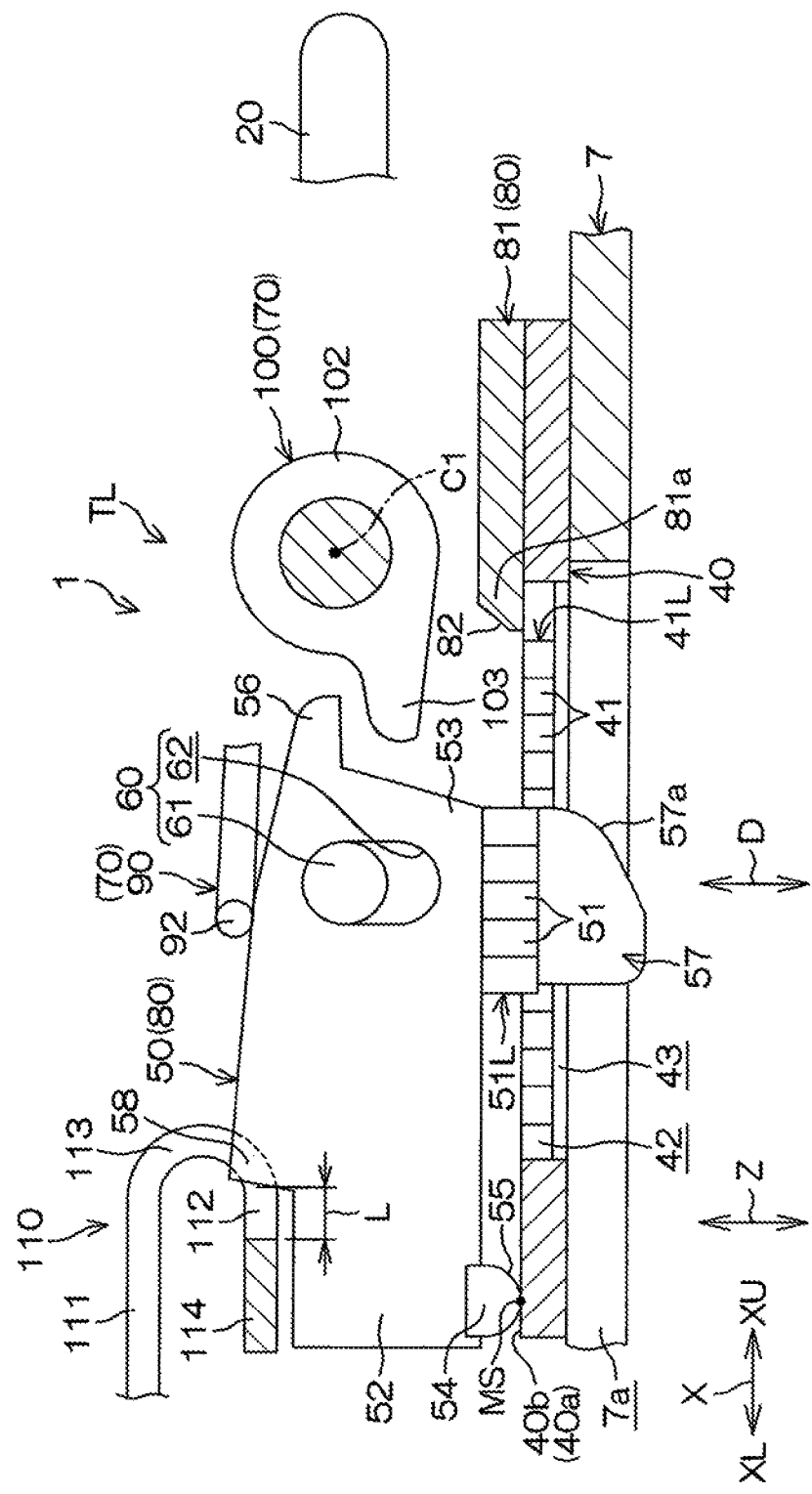
FIG. 5 is a schematic side view of the structure of the tooth locking mechanism and components adjacent thereto when the steering system is in a locked state.
Figure 6:
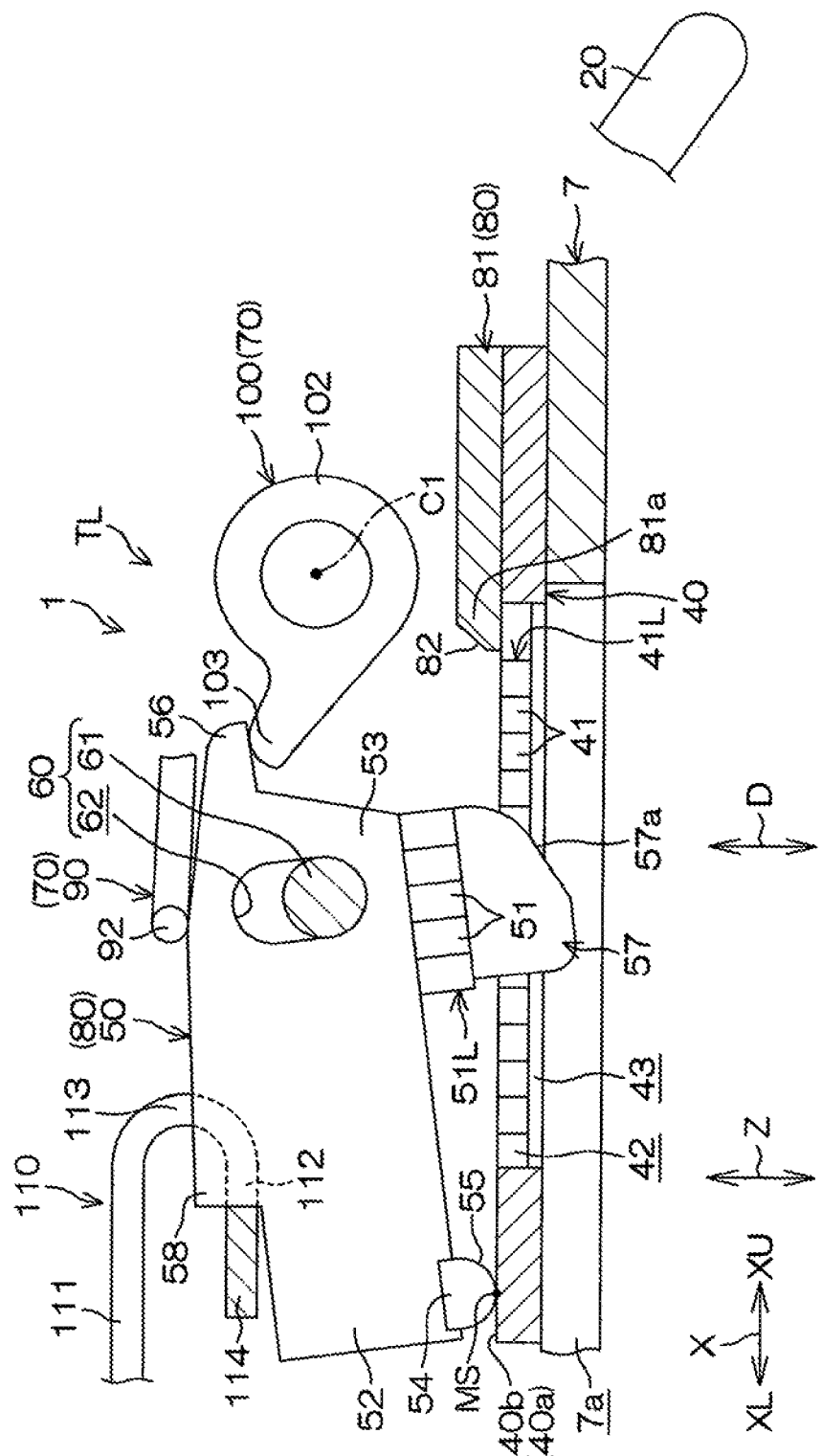
FIG. 6 is a schematic side view of the structure of the tooth locking mechanism and components adjacent thereto when the steering system is in an unlocked state.

FIG. 4 is an exploded perspective view of the tooth locking mechanism TL and components adjacent thereto. FIG. 5 is a schematic side view of the structure of the tooth locking mechanism TL and components adjacent thereto when the steering system 1 is in the locked state. FIG. 6 is a schematic side view of the structure of the tooth locking mechanism TL and components adjacent thereto when the steering system 1 is in the unlocked state. Referring to FIGS. 4 to 6, the tooth locking mechanism TL includes a first toothed member 40 and a second toothed member 50. The first toothed member 40 includes the first teeth 41 arranged in the column axial direction X. The second toothed member 50 includes the second teeth 51 configured to mesh with the first teeth 41.

The first toothed member 40 is provided using, for example, a plate member extending in the column axial direction X. The first toothed member 40 is secured to the outer peripheral surface of the upper jacket 7 by welding, for example. Thus, the first toothed member 40 moves together with the upper jacket 7 during telescopic adjustment. Alternatively, the first toothed member 40 may be secured to the upper jacket 7 with a screw, for example. The first toothed member 40 is provided with a recessed groove 42 elongated in the column axial direction X.

The recessed groove 42 includes a pair of inner surfaces extending in the column axial direction X and facing each other in the clamping axial direction J. The pair of inner surfaces are provided with a pair of first tooth rows 41L each including the first teeth 41. In each first tooth row 41L, the first teeth 41 are arranged in the column axial direction X. The tooth tips of the first teeth 41 of one of the pair of first tooth rows 41L face the tooth tips of the first teeth 41 of the other one of the pair of first tooth rows 41L in the clamping axial direction J. A tooth trace direction D of the first teeth 41 is perpendicular to both of the column axial direction X and the clamping axial direction J. The tooth trace direction D corresponds to the facewidth (tooth width) direction of the first teeth 41.

The second toothed member 50 includes a body 52 and a toothed portion 53. The body 52 is supported such that the body 52 is rotatable around a predetermined supporting point MS. The toothed portion 53 is integral with the body 52. The toothed portion 53 is provided with the second teeth 51. The second toothed member 50 includes a pair of second tooth rows 51L each including the second teeth 51 arranged at regular intervals. The second tooth rows 51L are provided on a region of the toothed portion 53 facing the first toothed member 40 in the tooth trace direction D. A direction in which the tooth tips of the second teeth 51 of one of the pair of second tooth rows 51L face outward is opposite to a direction in which the tooth tips of the second teeth 51 of the other one of the pair of second tooth rows 51L face outward. The second teeth 51 of each second tooth row 51L are configured to mesh with the first teeth 41 of the associated first tooth row 41l, in the tooth trace direction D.

The second toothed member 50 is rotatably supported by the supporting point MS movable in the column axial direction X. The second toothed member 50 further includes a pair of supporting arms 54 each having a semicircular cross-sectional shape. The supporting arms 54 each protrude laterally in the clamping axial direction J from an associated one of lateral surfaces 52a of the body 52. The peripheral surface of each supporting arm 54 is provided with a convexly curved received portion 55. A surface 40a of the first toothed member 40 includes a pair of receiving surfaces 40b disposed on both sides of the recessed groove 42 in the clamping axial direction J. The receiving surfaces 40b each receive an associated one of the received portions 55. The supporting point MS movable in the column axial direction X is provided on a position on the associated receiving surface 40b where the receiving surface 40b comes into contact with the associated received portion 55. The first toothed member 40 is a receiving member including the receiving surfaces 40b.

The tooth locking mechanism TL includes a guide mechanism 60 and a link mechanism 70. The guide mechanism 60 guides the toothed portion 53 of the second toothed member 50 in a perpendicular direction Z perpendicular to the column axial direction X. The link mechanism 70 links a motion of the second toothed member 50 to rotation of the clamping shaft 21. The perpendicular direction Z is also perpendicular to the clamping axial direction J. The guide mechanism 60 includes a guide shaft 61 and a guide hole 62. The ends of the guide shaft 61 are supported by supporting holes 38 in the pair of clamped portions 19 of the lower jacket 8. The guide hole 62 is provided in the toothed portion 53 of the second toothed member 50. The guide shaft 61 is in the form of a shaft extending in parallel with the clamping axial direction J. The guide shaft 61 is made of resin, for example. The guide shaft 61 is inserted through the guide hole 62. The guide shaft 61 is inserted through the supporting holes 38 and thus supported by the lower jacket 8. The second toothed member 50 is supported by the lower jacket 8 through the guide shaft 61. The guide hole 62 is an elongated hole extending in the perpendicular direction Z, with the first teeth 41 and the second teeth 51 meshing with each other.

The link mechanism 70 includes an urging member 90 and a releasing member 100. The urging member 90 urges the second toothed member 50 so as to rotate the second toothed member 50 around the supporting point MS such that the second toothed member 50 reaches a meshing side where the second teeth 51 mesh with the first teeth 41. The releasing member 100 moves the second toothed member 50 to a meshing releasing side against the urging member 90. The urging member 90 includes a first end 91, a second end 92, and a coil portion 93. Examples of the urging member 90 include a torsion spring. The first end 91 is retained by a retaining hole 39 that is a retainer provided in the associated clamped portion 19. The second end 92 is in pressing engagement with a region of the toothed portion 53 located opposite to the second teeth 51 of the second toothed member 50. The coil portion 93 located between the first end 91 and the second end 92 is wound around the clamping shaft 21.

The releasing member 100 includes an annular body 102 and a releasing protrusion 103. The body 102 includes a fitting hole 101. The clamping shaft 21 is spline-fitted to the fitting hole 101 such that the body 102 is rotatable together with the clamping shaft 21. The releasing protrusion 103 is protruded from the outer periphery of the body 102. Rotation of the clamping shaft 21 in the unlocking direction brings the releasing protrusion 103 into engagement with an engagement protrusion 56 provided on the toothed portion 53 of the second toothed member 50. This causes the second toothed member 50 to rotate to the meshing releasing side against the urging member 90.

The tooth locking mechanism TL rotates the second toothed member 50 to the meshing side and the meshing releasing side in conjunction with the clamping mechanism 18. Specifically, referring to FIG. 6, rotating the operating lever 20 in the locking direction (i.e., in the anticlockwise direction in FIG. 6) from an unlocking position causes the releasing member 100 to rotate anticlockwise from the state illustrated in FIG. 6 to the state illustrated in FIG. 5 together with the clamping shaft 21. Thus, the releasing protrusion 103 of the releasing member 100 comes out of engagement with the engagement protrusion 56 of the second toothed member 50. The urging member 90 causes the second toothed member 50 to rotate in the clockwise direction around the supporting point MS. The clockwise rotation of the second toothed member 50 around the supporting point MS causes the second teeth 51 to mesh with the first teeth 41 in the tooth trace direction D (see FIG. 5). This effects tooth locking, with the steering system 1 in the locked state. The position of the second toothed member 50 when the second teeth 51 mesh with the first teeth 41 will be referred to as a "meshing position".

Rotating the operating lever 20 in the unlocking direction (i.e., in the clockwise direction in FIG. 5) from a locking position causes the releasing member 100 to rotate clockwise from the state illustrated in FIG. 5 to the state illustrated in FIG. 6 together with the clamping shaft 21. The clockwise rotation of the releasing member 100 causes the releasing protrusion 103 of the releasing member 100 to push up the engagement protrusion 56 of the second toothed member 50. This rotates the second toothed member 50 anticlockwise around the supporting point MS. The anticlockwise rotation of the second toothed member 50 around the supporting point MS moves the second teeth 51 away from the first teeth 41 in the tooth trace direction D. Thus, the meshing of the second teeth 51 with the first teeth 41 is released (see FIG. 6). This releases tooth locking, with the steering system 1 in the unlocked state. The position of the second toothed member 50 when the meshing of the first teeth 41 with the second teeth 51 is released will be referred to as a "meshing releasing position".

As described above, rotation of the second toothed member 50 around the supporting point MS causes the second toothed member 50 to change its position between the meshing position and the meshing releasing position. The first toothed member 40 is secured to the upper jacket 7 and moves together with the upper jacket 7. With the second toothed member 50 located at the meshing position, the second toothed member 50 prevents movement of the first toothed member 40 in the column axial direction X. This prevents movement of the upper jacket 7 relative to the lower jacket 8 in the column axial direction X.

With the second toothed member 50 located at the meshing releasing position, the second toothed member 50 does not prevent movement of the first toothed member 40. Thus, the upper jacket 7 is movable relative to the lower jacket 8 in the column axial direction X. Referring to FIG. 4, the steering system 1 further includes a lower limit position limiting mechanism 80 to limit the sliding lower limit position of the telescopic stroke range. The lower limit position limiting mechanism 80 includes the above-described second toothed member 50 and a facing member 81. The facing member 81 faces, from the upward axial direction XU, the second toothed member 50 located at the meshing releasing position.

Referring to FIG. 6, the facing member 81 is secured to the upper jacket 7. Thus, the facing member 81 moves together with the upper jacket 7 during telescopic adjustment. The facing member 81 is a damper made of an elastic material, such as rubber. The facing member 81 abuts against (or comes into engagement with) the second toothed member 50 so as to limit the lower limit position of the upper jacket 7. When the facing member 81 is a damper, the facing member 81 absorbs (or cushions) an impact caused by abutment of the facing member 81 against the second toothed member 50.

The second toothed member 50 includes a first facing portion 57 facing the facing member 81 from the downward axial direction XL, with the second toothed member 50 located at the meshing releasing position. The first facing portion 57 is provided opposite to the body 52, with the second tooth rows 51L located therebetween. The first facing portion 57 includes a convexly curved inclined surface 57a. The inclined surface 57a is inclined such that the inclined surface 57a goes away from the upper jacket 7 as the inclined surface 57a extends in the upward axial direction XU, with the second toothed member 50 located at the meshing releasing position. The first facing portion 57 is inserted through a through groove 43 provided in the first toothed member 40 and a through groove 7a provided in the upper jacket 7, such that the first facing portion 57 is movable in the column axial direction X.

The facing member 81 includes an inclined surface 82 provided on an end 81a of the facing member 81 in the downward axial direction XL. The inclined surface 82 is linearly inclined such that the inclined surface 82 comes closer to the upper jacket 7 as the inclined surface 82 extends in the downward axial direction XL. Referring to FIG. 4, the steering system 1 further includes an impact absorbing member 110 and a guide member 120. At the time of a secondary collision resulting from a vehicle collision, the impact absorbing member 110 deforms so as to absorb an impact caused by the secondary collision. The guide member 120 guides deformation of the impact absorbing member 110 at the time of a secondary collision.

The impact absorbing member 110 includes a pair of first plates 111, a pair of second plates 112, and a connector 114. First ends of the pair of first plates 111 are secured to the lower jacket 8. The pair of second plates 112 are folded back from second ends of the pair of first plates 111 through folded back portions 113. The pair of second plates 112 are coupled to each other through the connector 114. As illustrated in FIGS. 2 and 3, the first ends of the pair of first plates 111 of the impact absorbing member 110 are secured to the lower jacket 8 with bolts 125, for example.

The guide member 120 includes a pair of first guide portions 121, a second guide portion 122, and a pair of connections 123 elongated in the column axial direction X. The pair of first guide portions 121 are disposed at a distance from each other in the clamping axial direction J. The second guide portion 122 is disposed between the pair of first guide portions 121 and outward of the pair of first guide portions 121 in a radial direction of the steering shaft 3. The second guide portion 122 is connected to each of the first guide portions 121 through an associated one of the connections 123. As illustrated in FIG. 2, ends of the first guide portions 121 of the guide member 120 and the associated first ends of the first plates 111 of the impact absorbing member 110 are fastened together with the bolts 125, for example, such that the guide member 120 is secured to the lower jacket 8.

Each of the first guide portions 121 prevents the impact absorbing member 110 (in particular, the first plates 111) from being deformed outward in the radial direction of the steering shaft 3 at the time of a vehicle collision. The second guide portion 122 guides movement of the second toothed member 50 in the column axial direction X at the time of a vehicle collision. Referring to FIG. 5, the second toothed member 50 includes a second facing portion 58 facing the impact absorbing member 110 from the upward axial direction XU. The second facing portion 58 is provided on a region of the body 52 located in the upward axial direction XU relative to the pair of supporting arms 54 and opposite to the first toothed member 40 in the perpendicular direction Z.

With the second toothed member 50 located at the meshing position, the second facing portion 58 faces the connector 114 of the impact absorbing member 110 from the upward axial direction XU with a clearance L between the second facing portion 58 and the connector 114. With the second toothed member 50 located at the meshing releasing position, the second facing portion 58 is in abutment with the connector 114 of the impact absorbing member 110 (see FIG. 6). When the second toothed member 50 changes its position from the meshing position to the meshing releasing position, i.e., when the second toothed member 50 changes its position from the position illustrated in FIG. 5 to the position illustrated in FIG. 6, the second facing portion 58 comes closer to the connector 114 from the upward axial direction XU and eventually abuts against the connector 114.

The second toothed member 50 may receive an impact from the first toothed member 40 or the facing member 81. Specifically, the second toothed member 50 may receive an impact from the first toothed member 40 at the time of a secondary collision resulting from a vehicle collision, or may receive an impact from the facing member 81 when the column jacket 6 is in the telescopically shortest state during telescopic adjustment. In this embodiment, the guide shaft 61 is supported by the lower jacket 8 immovable in the column axial direction X at the time of a vehicle collision or during telescopic adjustment. The guide shaft 61 is inserted through the guide hole 62 provided in the second toothed member 50. Thus, an impact that the second toothed member 50 receives from the first toothed member 40 or the facing member 81 is transmitted to the guide shaft 61. When a load applied to the guide shaft 61 owing to this impact is equal to or larger than a load necessary for rupture of the guide shaft 61 (i.e., a maximum value F for a rupture load F described below), the guide shaft 61 ruptures.

Figure 7A:
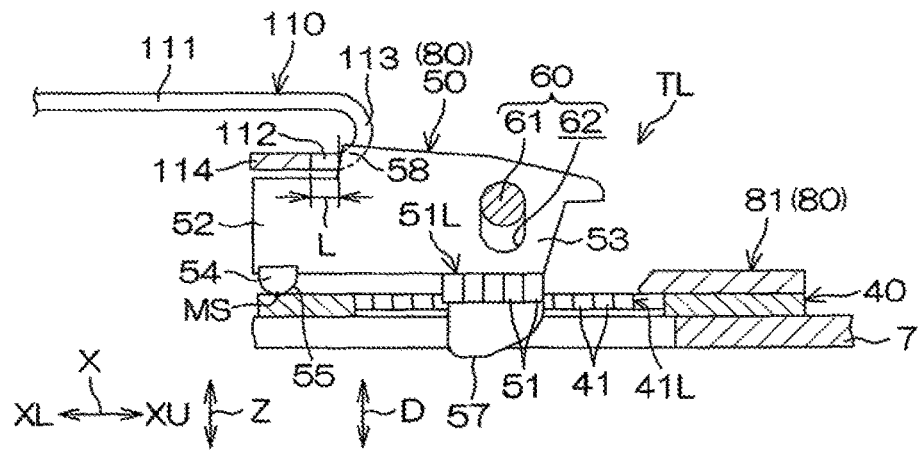
FIGS. 7A to 7C are schematic diagrams illustrating how the tooth locking mechanism operates at the time of a vehicle collision.
Figure 7B:
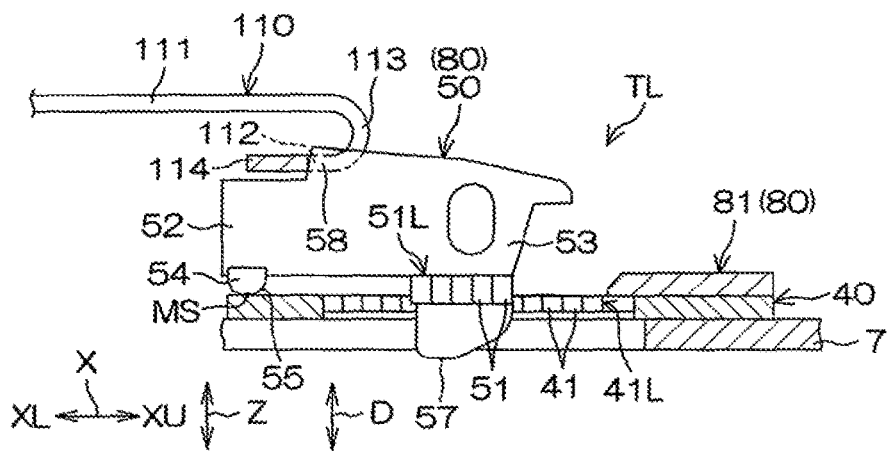
Figure 7C:
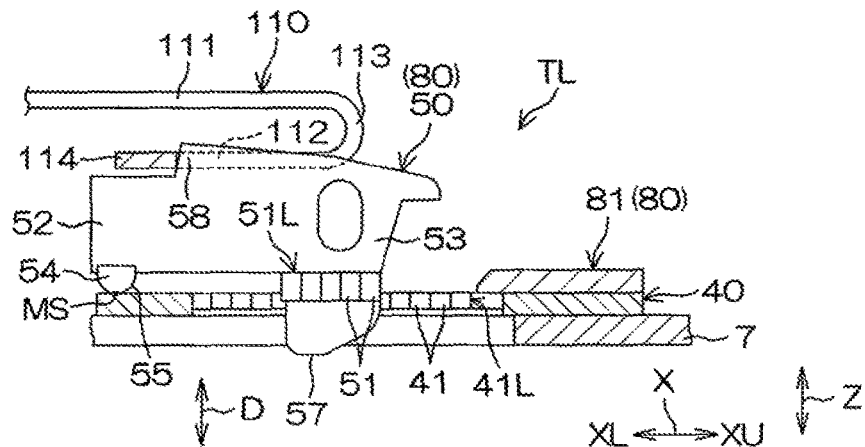

The following description discusses in detail how the tooth locking mechanism TL and components adjacent thereto (e.g., the impact absorbing member 110) operate when a secondary collision occurs and when the column jacket 6 is in the telescopically shortest state. FIGS. 7A to 7C are schematic diagrams illustrating how the tooth locking mechanism TL operates at the time of a secondary collision. Under normal circumstances, the steering system 1 is in the locked state during travel of the vehicle. As illustrated in FIG. 7A, the second toothed member 50 is located at the meshing position when the steering system 1 is in the locked state. With the second toothed member 50 located at the meshing position, the second toothed member 50 prevents movement of the first toothed member 40 in the column axial direction X. Thus, when a secondary collision occurs during driving of the vehicle, the second toothed member 50 receives an impact from the first toothed member 40. Because the guide shaft 61 supported by the lower jacket 8 is inserted through the second toothed member 50, the guide shaft 61 ruptures upon receiving this impact.

As illustrated in FIG. 7B, the second toothed member 50 moves in the column axial direction X by a distance equivalent to the clearance L between the second facing portion 58 of the second toothed member 50 and the connector 114 of the impact absorbing member 110, and collides against the impact absorbing member 110. As illustrated in FIG. 7C, the body 52 of the second toothed member 50 presses and moves the connector 114 of the impact absorbing member 110 in the downward axial direction XL. Thus, the first plates 111 and the second plates 112 of the impact absorbing member 110 are plastically deformed such that the folded back portion 113 moves in the downward axial direction XL. This absorbs the impact caused by the secondary collision.

Until the upper jacket 7 comes to rest, the impact absorbing member 110 keeps absorbing the impact by its deformation.

As described above, at the time of a secondary collision, the second toothed member 50 located at the meshing position receives an impact from the first toothed member 40. Thus, the second toothed member 50 collides against the impact absorbing member 110 after rupture of the guide shaft 61 so as to deform the impact absorbing member 110. The deformation of the impact absorbing member 110 absorbs the impact. Until the upper jacket 7 comes to rest, the impact absorbing member 110 keeps absorbing the impact by its deformation.

Figure 8A:
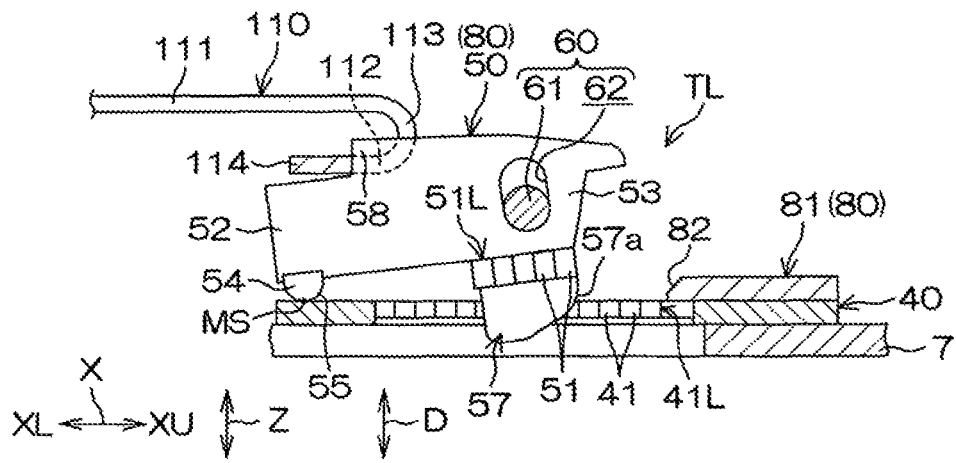
FIGS. 8A to 8C are schematic diagrams illustrating how the tooth locking mechanism operates during telescopic adjustment.
Figure 8B:
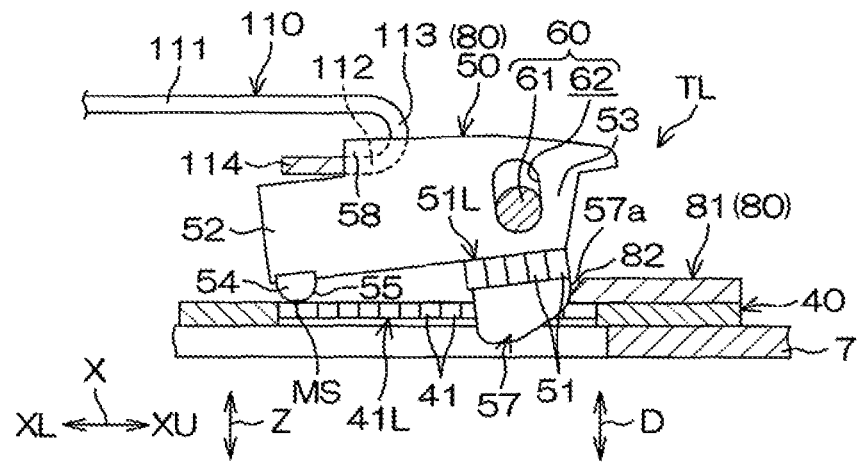
Figure 8C:
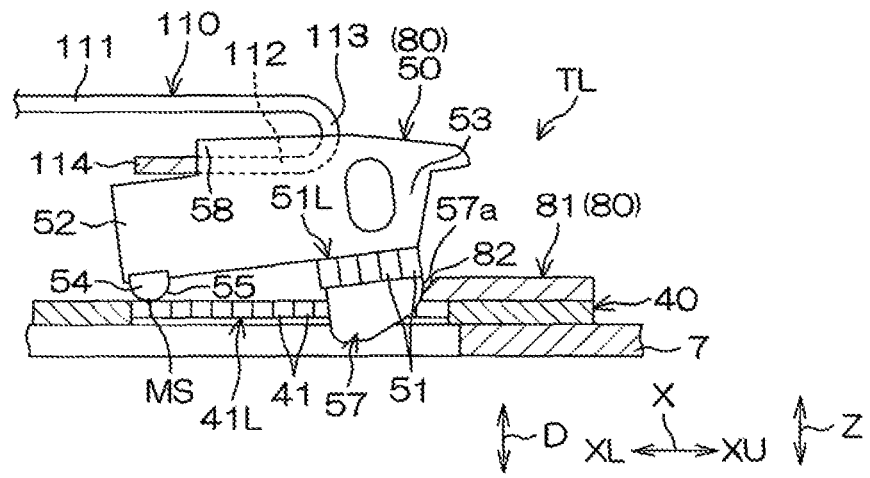

FIGS. 8A to 8C are schematic diagrams illustrating how the tooth locking mechanism TL operates when the column jacket 6 is in the telescopically shortest state. During telescopic adjustment, the steering system 1 is in the unlocked state. Referring to FIG. 8A, as previously described, the second toothed member 50 is located at the meshing releasing position, with the steering system 1 in the unlocked state.

As illustrated in FIG. 8I, movement of the upper jacket 7 to the telescopically shortest position by making a telescopic adjustment causes the facing member 81 to collide against the first facing portion 57 of the second toothed member 50 located at the meshing releasing position. Thus, the second toothed member 50 receives an impact from the facing member 81. The guide shaft 61 supported by the lower jacket 8 is inserted through the second toothed member 50, so that the impact is transmitted to the guide shaft 61. The second toothed member 50 located at the meshing releasing position is in abutment with the impact absorbing member 110. Thus, the impact is also transmitted to the impact absorbing member 110 when the column jacket 6 is in the telescopically shortest state.

Accordingly, as illustrated in FIG. 8C, rupture of the guide shaft 61 and deformation of the impact absorbing member 110 occur concurrently. The deformation of the impact absorbing member 110 absorbs the impact. Until the upper jacket 7 comes to rest, the impact absorbing member 110 keeps absorbing the impact by its deformation. Thus, the second toothed member 50 located at the meshing releasing position receives the impact from the facing member 81 so as to cause the rupture of the guide shaft 61 and the deformation of the impact absorbing member 110 to occur concurrently.

Figure 9:
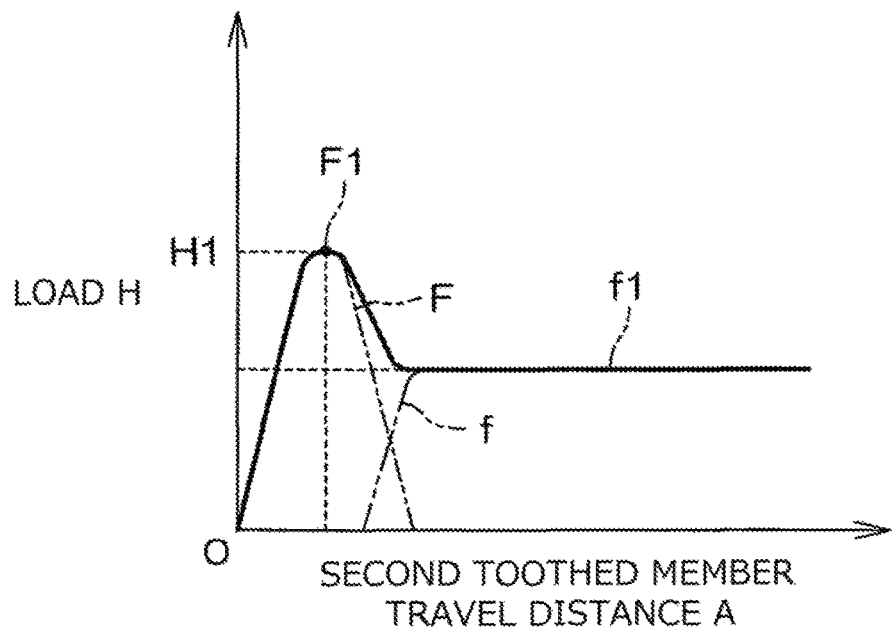
FIG. 9 is a graph illustrating the relationship between a travel distance of a second toothed member and a load absorbed by a rupturable member and an impact absorbing member when the second toothed member moves at the time of a vehicle collision.
Figure 10:
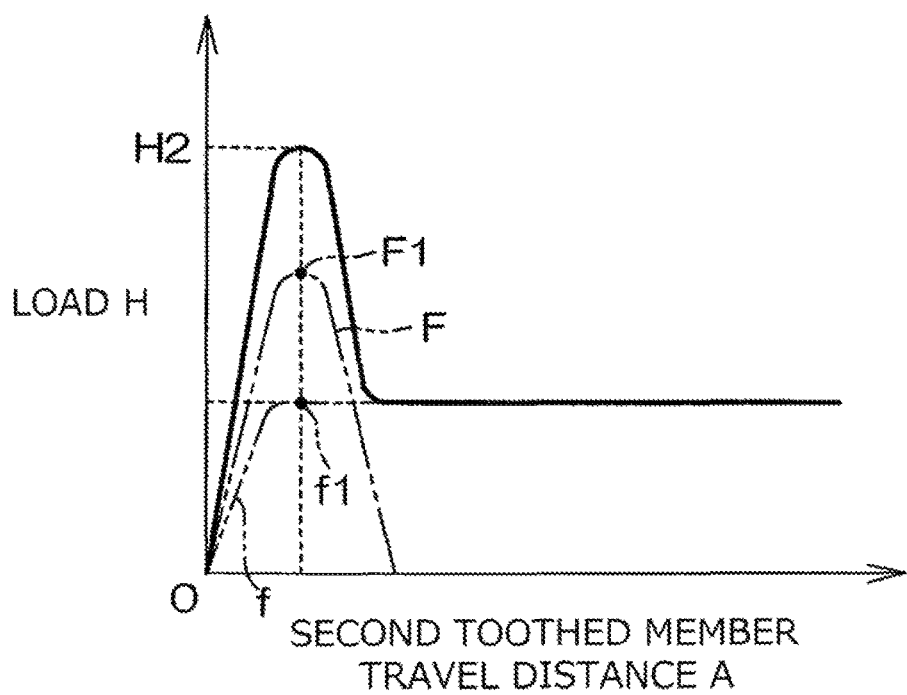
FIG. 10 is a graph illustrating the relationship between a travel distance of the second toothed member and a load absorbed by the rupturable member and the impact absorbing member when the second toothed member moves during telescopic adjustment.

The following description discusses the magnitude of an impact (load) absorbed by the guide shaft 61 and the impact absorbing member 110 when a secondary collision occurs and when the column jacket 6 is in the telescopically shortest state. FIG. 9 is a graph illustrating the relationship between a travel distance A of the second toothed member 50 in the column axial direction X and a load H to be absorbed when the second toothed member 50 moves in the column axial direction X at the time of a secondary collision. FIG. 10 is a graph illustrating the relationship between the travel distance A of the second toothed member 50 in the column axial direction X and the load H to be absorbed when the second toothed member 50 moves in the column axial direction X during telescopic adjustment.

As indicated by the long dashed double-short dashed lines in FIGS. 9 and 10, a load to be absorbed by rupture of the guide shaft 61 is defined as the rupture load F. The rupture load F must reach the maximum value F1 in order to completely rupture the guide shaft 61. A load to be absorbed by deformation of the impact absorbing member 110 is defined as a deformation load f. Application of a predetermined load (e.g., a load at a maximum value f1) to the impact absorbing member 110 must be continued in order to continue plastic deformation of the impact absorbing member 110. The maximum value F1 for the rupture load F is greater than the maximum value f1 for the deformation load f.

As used herein, the term "disengagement" refers to a state where rupture of the guide shaft 61 allows movement of the upper jacket 7 relative to the lower jacket 8 in the column axial direction X. A load necessary for the disengagement will be referred to as a "disengagement load". Referring to FIG. 9, a disengagement load to be applied at the time of a secondary collision is equivalent to a maximum value H1 for the load H to be absorbed when the second toothed member 50 moves in the column axial direction X at the time of a secondary collision. When a secondary collision occurs, the second toothed member 50 collides against the impact absorbing member 110 after rupture of the guide shaft 61. This means that absorption of an impact by the impact absorbing member 110 starts after the rupture load F reaches the maximum value F1. Thus, the disengagement load (i.e., the load H at the maximum value H1) applied at the time of a secondary collision is equivalent to the maximum value F1 for the rupture load F.

Referring to FIG. 10, the disengagement load applied when the column jacket 6 is in the telescopically shortest state is equivalent to a maximum value H2 for the load H to be absorbed when the second toothed member 50 moves in the column axial direction X while the column jacket 6 is in the telescopically shortest state. When the column jacket 6 is in the telescopically shortest state, rupture of the guide shaft 61 and plastic deformation of the impact absorbing member 110 occur concurrently. This means that rupture of the guide shaft 61 and deformation of the impact absorbing member 110 start simultaneously. Thus, the disengagement load applied when the column jacket 6 is in the telescopically shortest state is equivalent to the sum of the maximum value F1 for the rupture load F and the deformation load f. Accordingly, the disengagement load (i.e., the load H at the maximum value H2) applied when the column jacket 6 is in the telescopically shortest state is greater than the disengagement load (i.e., the load H at the maximum value H1) applied at the time of a secondary collision (H2>H1).

Suppose that the deformation load f reaches the maximum value f1 at the time when the rupture load F reaches the maximum value F as in this embodiment. In this case, the disengagement load (i.e., the load H at the maximum value H2) applied when the column jacket 6 is in the telescopically shortest state is equivalent to the sum of the maximum value F for the rupture load F and the maximum value f1 for the deformation load f. This means that a load necessary for rupture of the guide shaft 61 when the column jacket 6 is in the telescopically shortest state is larger than a load necessary for rupture of the guide shaft 61 when a secondary collision occurs. In other words, the impact absorbing member 110 absorbs a portion of an impact transmitted to the guide shaft 61 from the second toothed member 50 when the column jacket 6 is in the telescopically shortest state. Thus, an impact received by the guide shaft 61 when the column jacket 6 is in the telescopically shortest state is smaller than an impact received by the guide shaft 61 when a secondary collision occurs.

In this embodiment, the second toothed member 50 located at the meshing position receives an impact from the first toothed member 40 at the time of a vehicle collision (or more specifically, at the time of a secondary collision). Thus, the second toothed member 50 collides against the impact absorbing member 110 after rupture of the guide shaft 61 so as to deform the impact absorbing member 110. The second toothed member 50 located at the meshing releasing position receives an impact from the facing member 81 during telescopic adjustment (or more specifically, when the column jacket 6 is in the telescopically shortest state). Thus, rupture of the guide shaft 61 and deformation of the impact absorbing member 110 occur concurrently. Consequently, an impact that the second toothed member 50 receives from the facing member 81 is distributed to the impact absorbing member 110 and the guide shaft 61. This reduces an impact received by the guide shaft 61 during telescopic adjustment.

Accordingly, if an impact received by the second toothed member 50 during telescopic adjustment is substantially equal to an impact received by the second toothed member 50 at the time of a vehicle collision, an impact received by the guide shaft 61 owing to the telescopic adjustment would be smaller than an impact received by the guide shaft 61 owing to the vehicle collision. Thus, assuming that the steering system 1 includes a rupturable member (i.e., the guide shaft 61) that ruptures upon receiving an impact, this embodiment prevents rupture of the rupturable member (i.e., the guide shaft 61) caused by an impact during telescopic adjustment.

In this embodiment, the second toothed member 50 located at the meshing position faces the impact absorbing member 110 from the upward axial direction XU, with the clearance L between the second toothed member 50 and the impact absorbing member 110. The second toothed member 50 located at the meshing releasing position faces the impact absorbing member 110 from the upward axial direction XU such that the second toothed member 50 is closer to the impact absorbing member 110 than when the second toothed member 50 is located at the meshing position (i.e., such that the second toothed member 50 is in abutment with the impact absorbing member 110 in this embodiment). Thus, the second toothed member 50 changes its position so as to change the clearance L between the impact absorbing member 110 and the second toothed member 50 in the column axial direction X. This makes it possible to adjust the timing of rupture of the guide shaft 61 and the timing of deformation of the impact absorbing member 110.

Thus, an impact received by the guide shaft 61 owing to a telescopic adjustment when the second toothed member 50 is located at the meshing releasing position is easily made smaller than an impact received by the guide shaft 61 owing to a vehicle collision when the second toothed member 50 is located at the meshing position. In this embodiment, the second toothed member 50 is configured such that the second toothed member 50 located at the meshing releasing position abuts against the impact absorbing member 110 from the upward axial direction XU. Accordingly, when the second toothed member 50 receives an impact from the facing member 81, rupture of the guide shaft 61 and deformation of the impact absorbing member 110 occur simultaneously. Consequently, this embodiment further reduces an impact received by the rupturable member during telescopic adjustment.

Figure 11A:
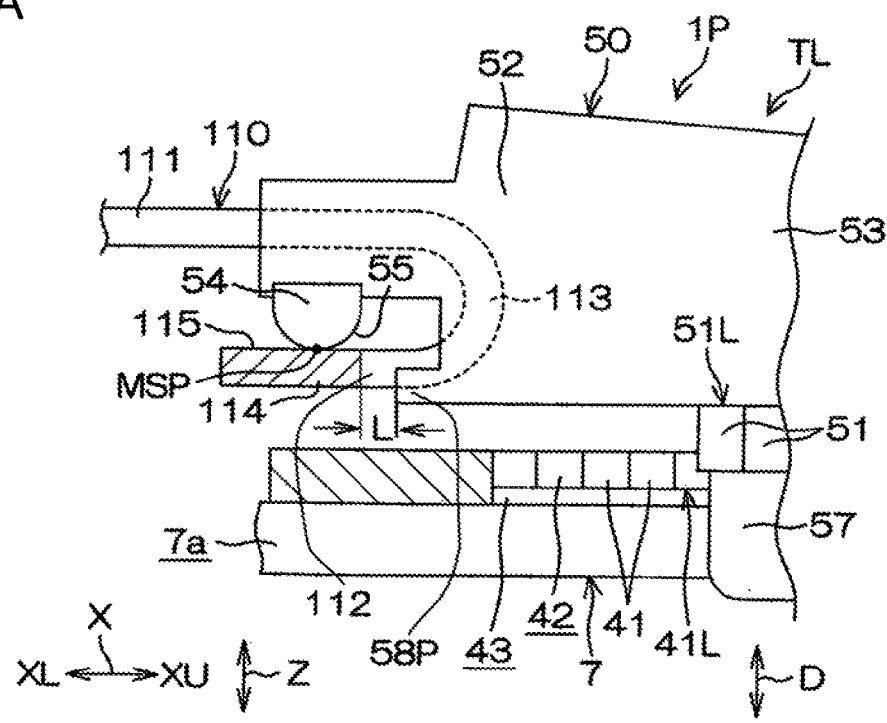
FIG. 11A is a schematic diagram of a second toothed member of a steering system according to a second embodiment of the invention and components adjacent to the second toothed member when the steering system is in the locked state.
Figure 11B:
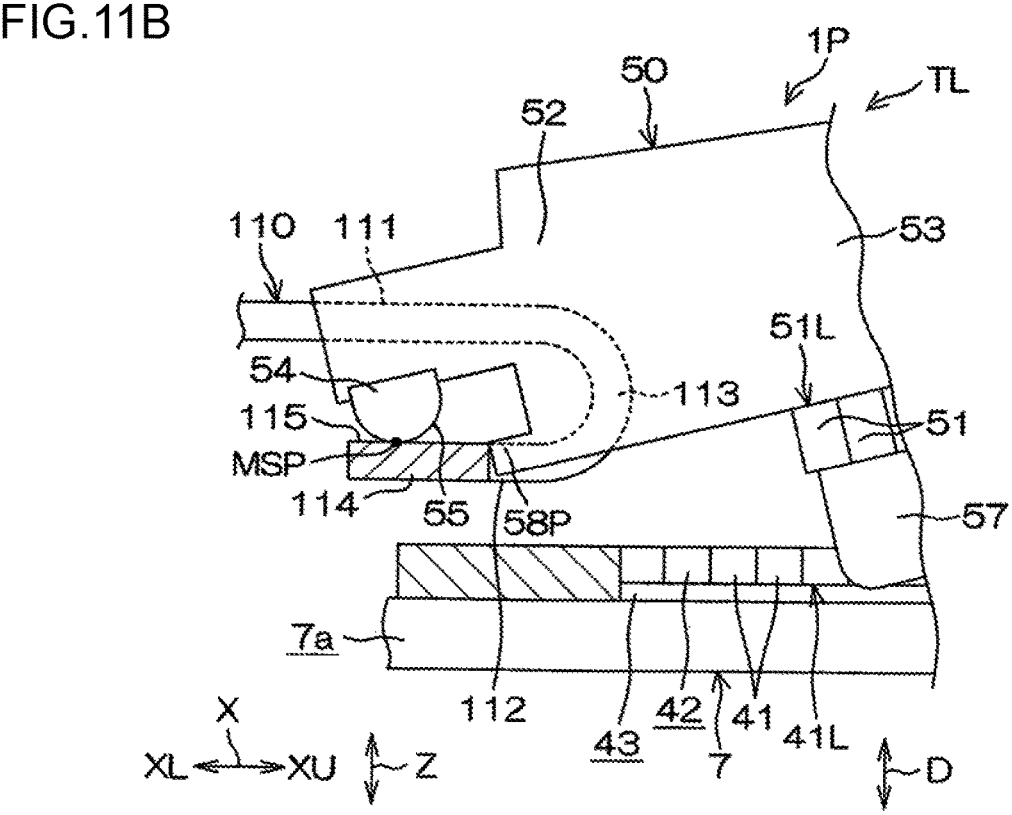
FIG. 11B is a schematic diagram of the second toothed member of the steering system according to the second embodiment of the invention and the components adjacent thereto when the steering system is in the unlocked state.

In this embodiment, a simple mechanism involving rotation of the second toothed member 50 around the supporting point MS enables the second toothed member 50 to properly change its position between the meshing position and the meshing releasing position. FIGS. 11A and 11B are schematic diagrams illustrating the second toothed member 50 of a steering system 1P according to a second embodiment of the invention and components adjacent to the second toothed member 50. FIG. 11A illustrates the second toothed member 50 and components adjacent thereto when the steering system 1P is in the locked state. FIG. 11B illustrates the second toothed member 50 and components adjacent thereto when the steering system 1P is in the unlocked state. In the second embodiment illustrated in FIGS. 11A and 11B, components similar to those previously described are identified by the same reference characters, and description thereof will be omitted.

A principal difference between the steering system 1P according to the second embodiment and the steering system 1 according to the first embodiment (see FIG. 5) is that the received portions 55 of the second toothed member 50 are received by a receiving surface 115 defined by the connector 114 and the second plates 112 as illustrated in FIG. 11A. A supporting point MSP movable in the column axial direction X is provided on the receiving surface 115. The second toothed member 50 is rotatably supported by the supporting point MSP.

In the second embodiment, a second facing portion 58P of the second toothed member 50 faces, from the upward axial direction XU, the connector 114 of the impact absorbing member 110 located closer to the first toothed member 40 than the pair of supporting arms 54 in the perpendicular direction Z. The second facing portion 58P is provided on an end of the body 52 located in the upward axial direction XU relative to the pair of supporting arms 54 and located adjacent to the first toothed member 40 in the perpendicular direction Z. The second facing portion 58P is a protrusion protruding in the downward axial direction XL from the end of the body 52 located adjacent to the first toothed member 40 in the perpendicular direction Z.

In the locked state illustrated in FIG. 11A, the second toothed member 50 is located at the meshing position. With the second toothed member 50 located at the meshing position, the second facing portion 58P faces the connector 114 of the impact absorbing member 110 from the upward axial direction XU, with the clearance L between the second facing portion 58P and the connector 114. In the unlocked state illustrated in FIG. 11B, the second toothed member 50 is located at the meshing releasing position. With the second toothed member 50 located at the meshing releasing position, the second facing portion 58P is in abutment with the connector 114 of the impact absorbing member 110. The receiving surface 115 may be defined by only the second plates 112.

In the second embodiment, the second toothed member 50 does not necessarily have to include the pair of supporting arms 54, and the received portion(s) 55 may be curved convex portion(s) provided on an end of the body 52 in the downward axial direction XL. In this case, the receiving surface 115 is defined by only the connector 114. The invention is not limited to the above-described embodiments, but various changes and modifications may be made within the scope of the claims.

In an alternative embodiment, the steering system may be configured such that the second toothed member 50 located at the meshing releasing position does not abut against the impact absorbing member 110 from the upward axial direction XU. The second toothed member 50 located at the meshing releasing position may face the impact absorbing member 110 from the upward axial direction XU such that the second toothed member 50 is closer to the impact absorbing member 110 than when the second toothed member 50 is located at the meshing position.

Various other changes and modifications may be made to the invention within the scope of the claims.

What is claimed is:

1. A steering system comprising:
an upper jacket movable in an axial direction, the upper jacket including a first axial end and a second axial end, the first axial end being connected with a steering member;
a lower jacket fitted to the second axial end of the upper jacket;
a first toothed member secured to the upper jacket, the first toothed member being configured to move together with the upper jacket, the first toothed member including first teeth arranged in the axial direction;
a second toothed member including second teeth configured to mesh with the first teeth, the second toothed member being configured to change its position between a meshing position where the first teeth mesh with the second teeth and a meshing releasing position where the first teeth do not mesh with the second teeth;
a facing member configured to move together with the upper jacket, the facing member facing, from the first axial end, the second toothed member located at the meshing releasing position;
a rupturable member supported by the lower jacket, the rupturable member being disposed through the second toothed member, the rupturable member being rupturable by an impact received by the second toothed member from the first toothed member or the facing member and transmitted to the rupturable member; and
an impact absorbing member configured to deform so as to absorb an impact received by the second toothed member, wherein
the second toothed member located at the meshing position receives an impact from the first toothed member so as to collide against the impact absorbing member after rupture of the rupturable member and deform the impact absorbing member, and
the second toothed member located at the meshing releasing position receives an impact from the facing member so as to cause rupture of the rupturable member and deformation of the impact absorbing member to occur concurrently.

2. The steering system according to claim 1, wherein
the second toothed member located at the meshing position faces the impact absorbing member from the first axial end, with a clearance between the second toothed member and the impact absorbing member, and
the second toothed member located at the meshing releasing position faces the impact absorbing member from the first axial end such that the second toothed member is closer to the impact absorbing member than when the second toothed member is located at the meshing position.

3. The steering system according to claim 2, wherein
the second toothed member located at the meshing releasing position abuts against the impact absorbing member from the first axial end.

4. The steering system according to claim 3, wherein
rotation of the second toothed member around a supporting point enables the second toothed member to change its position between the meshing position and the meshing releasing position.

5. The steering system according to claim 2, wherein
rotation of the second toothed member around a supporting point enables the second toothed member to change its position between the meshing position and the meshing releasing position.

6. The steering system according to claim 1, wherein rotation of the second toothed member around a supporting point enables the second toothed member to change its position between the meshing position and the meshing releasing position.

\* \* \* \* \*